May 12, 1936.   E. I. McKESSON   2,040,095
PHYSIOLOGICAL MEASURING
Filed Sept. 29, 1930   4 Sheets-Sheet 4
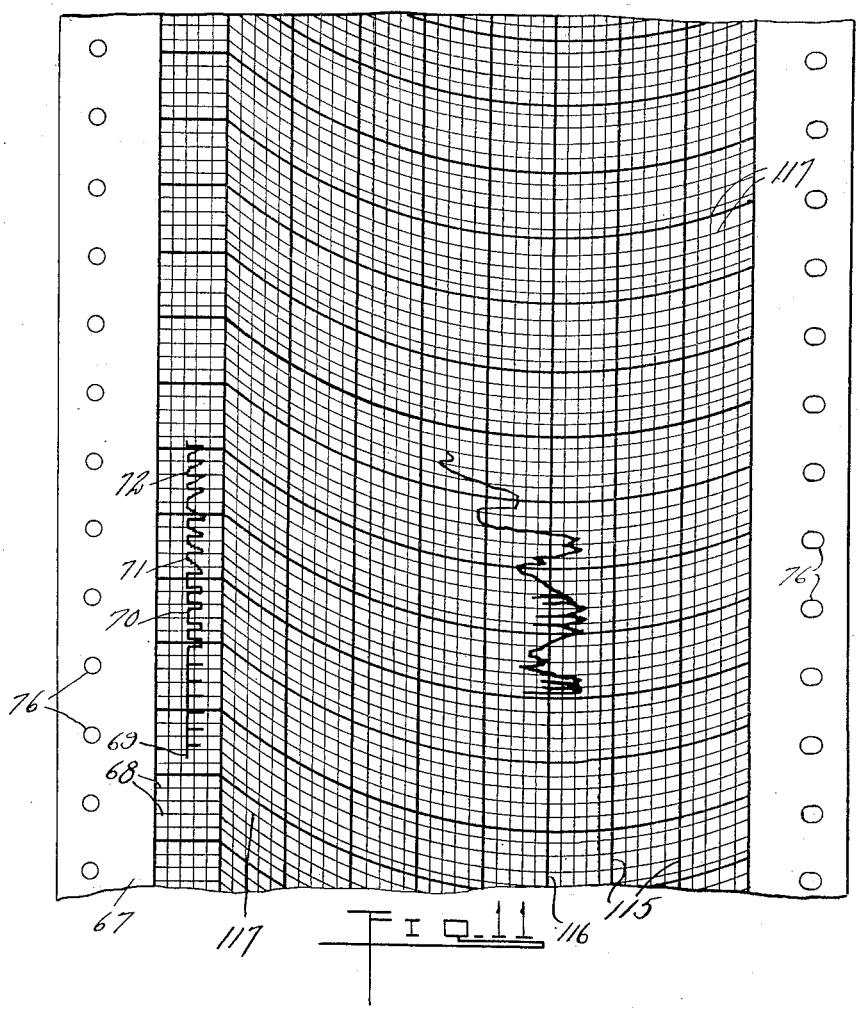
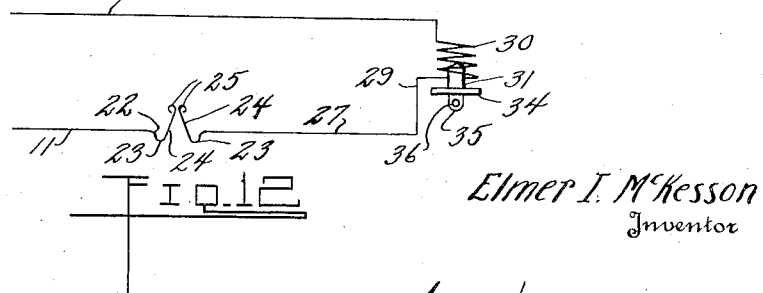
Elmer I. McKesson
Inventor Patented May 12, 1936

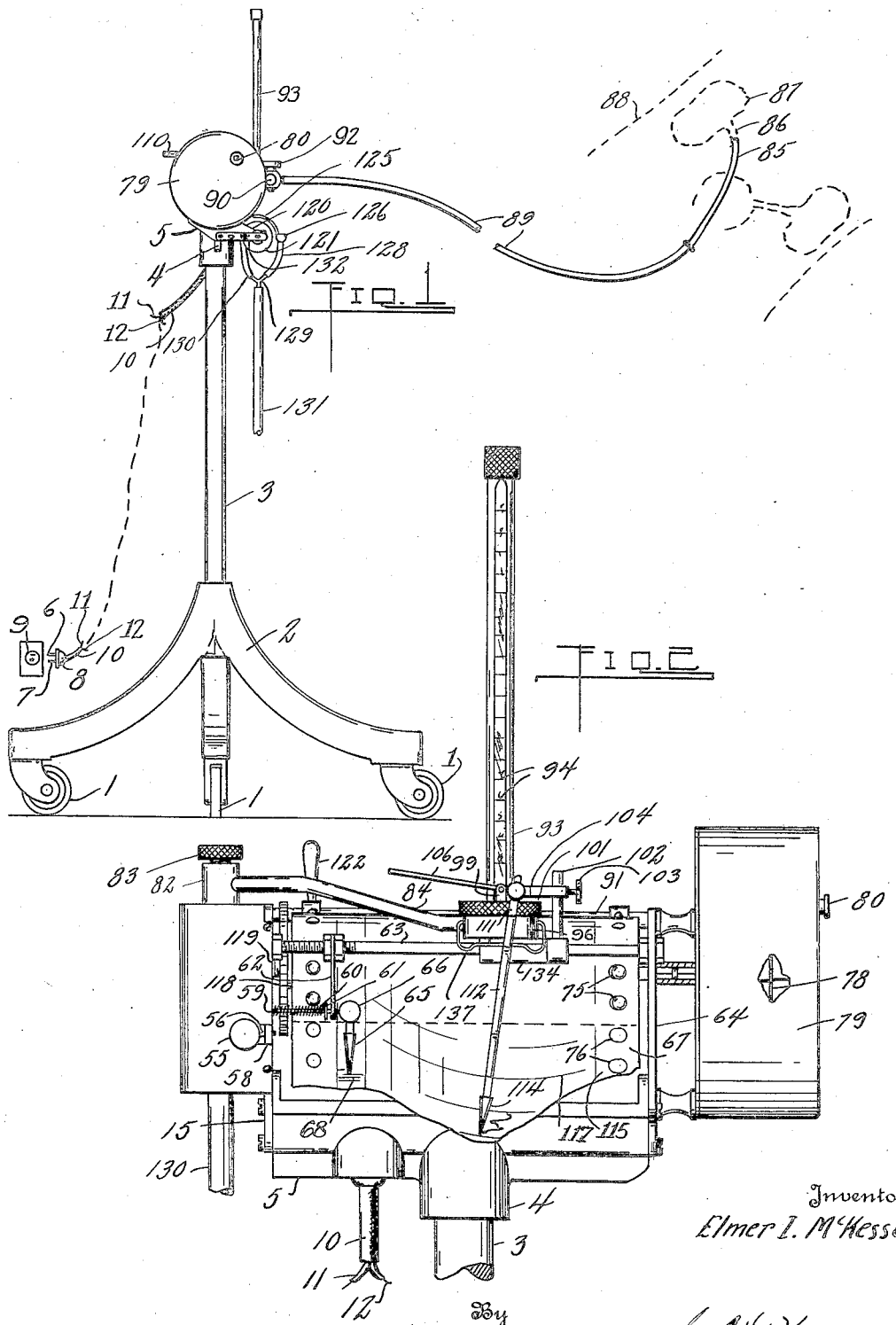

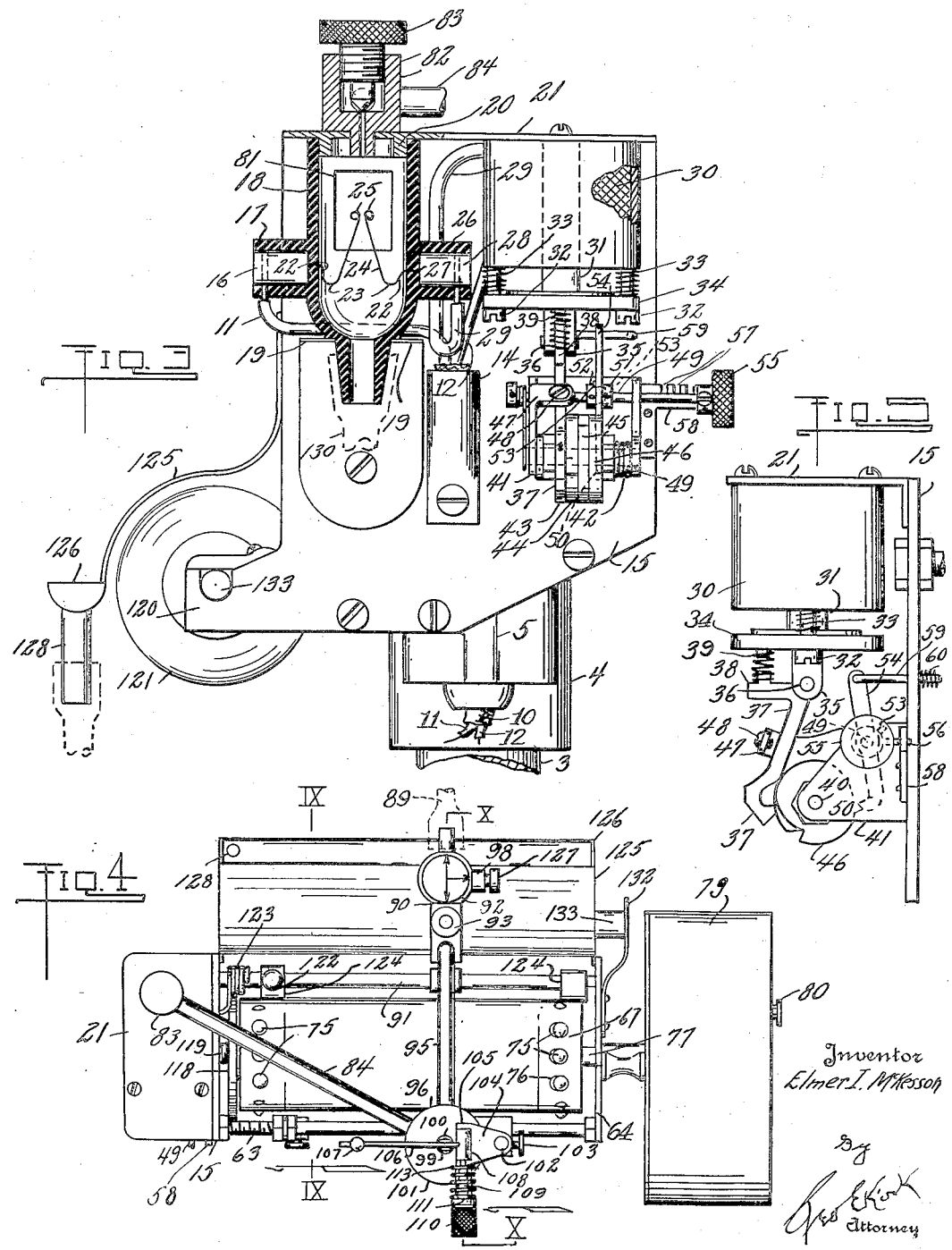

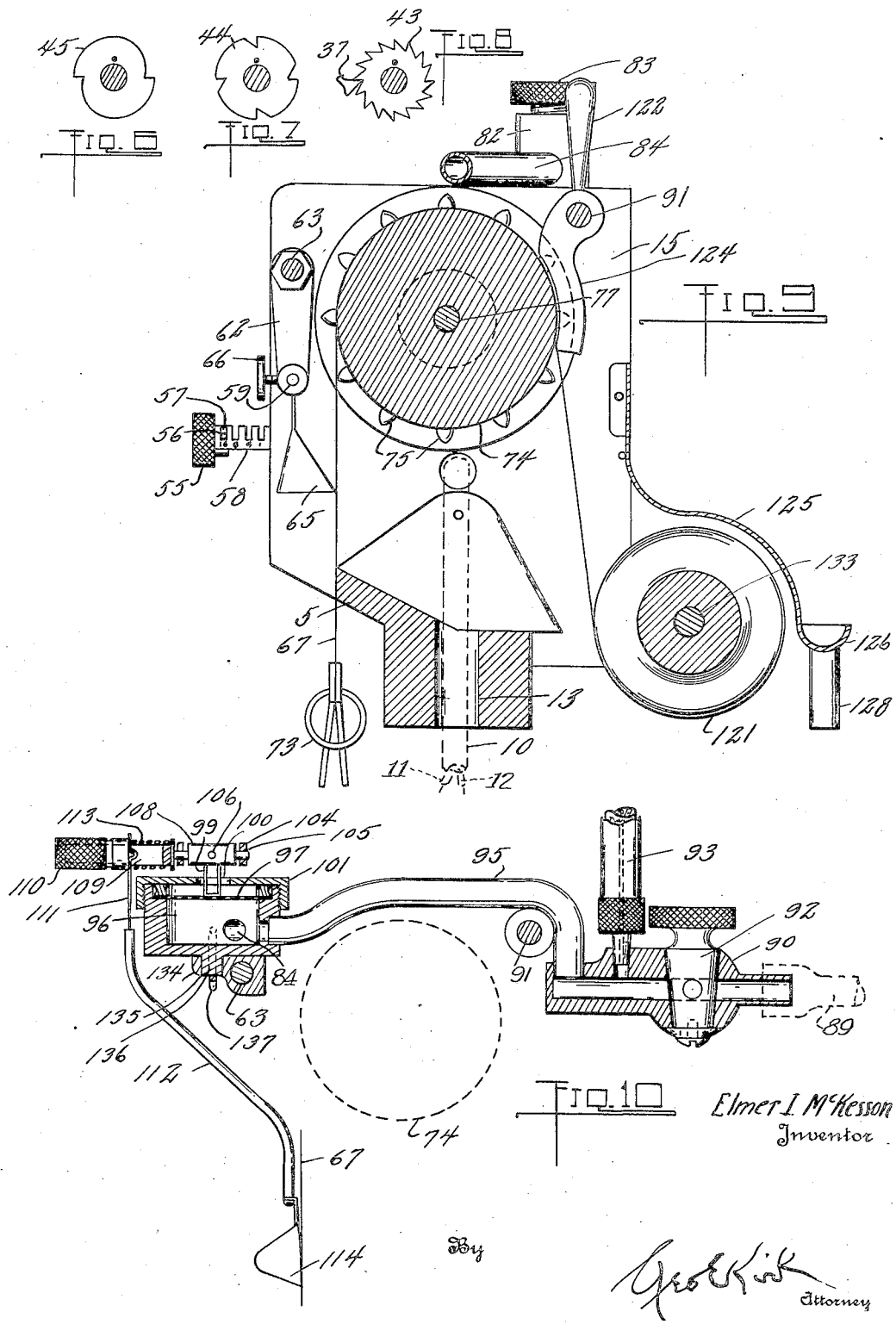

2,040,095

UNITED STATES PATENT OFFICE 2,040,095

PHYSIOLOGICAL MEASURING

Elmer I. McKesson, Toledo, Ohio; Martha F. McKesson, executrix of said Elmer I. McKesson, deceased, assignor to Martha F. McKesson, Toledo, Ohio Application September 29, 1930, Serial No. 485,082

5 Claims. (Cl. 234—1.5)

This invention relates to performance testing, more especially as involving features of record or control.

This invention has utility when incorporated in checking the flow rates of liquid and the varying conditions thereof, even with the production of direct records therefrom. While as a control there is possible ease in delicate adjustment for timing operations, as by the making and breaking of an electric circuit, the instance herein disclosed in the drawings has to do with the diagnosis of kidney condition from ureter action and flow effected thereby, altho in the form of the disclosure it is not only susceptible of use in connection with other body fluids, but even in other laboratory or physical testing procedures. Specifically, the device of this disclosure is effective to record the contractions of the ureter and the excretion of urine by drops. The ureters are the tubes through which urine flows from the kidney to the bladder. Under normal physiological conditions the drainage of urine from the renal pelvis is primarily dependent upon a normally contracting ureter. A diagnosis of dilatation of the ureter can be made under the disclosure herein as exemplified by the charts. It is a visual demonstration of the power with which the urine is driven from the kidney to the bladder. Not only are the movements of the ureter accurately recorded, but at the same time the rate of kidney excretion is charted in drops or multiples thereof per unit of time.

Referring to the drawings:

Fig. 1 is a general view of an embodiment of the invention, with parts broken away, and having catheter terminus for entrance into a ureter of a human being;

Fig. 2 is a front elevation, on an enlarged scale of portions of the apparatus of Fig. 1;

Fig. 3 is a still further enlarged fragmentary view, from the left of Fig. 2;

Fig. 4 is a plan view of the apparatus of Fig. 2;

Fig. 5 is a detail view of the solenoid mechanism;

Figs. 6, 7, 8, are detail views of integrating or counting ratchets transmitting for code graph control;

Fig. 9 is a section on the line IX—IX, Fig. 4;

Fig. 10 is a section on the line X—X, Fig. 4;

Fig. 11 is a chart portion showing graph features thereon; and

Fig. 12 is a wiring diagram.

Casters 1 (Fig. 1) on three-armed spider 2 serve in imparting ready portability to the apparatus herein. Upstanding from the spider 2 is rod 3 entering socket 4 of main frame 5 of the apparatus. Electric terminals 6, 7, of fitting 8, may be inserted in a usual lighting circuit outlet 9, which may be 110 volt alternating current supply. The apparatus is thus in condition for operation in usual hospitals, laboratories, and even in offices and homes, in connection with electric current there available. From the fitting 8 extends flexible conduit 10 as a sheath for electric conductor wires 11, 12 (Figs. 1, 2, 3, 9, 12), not only to the frame 5, but up thru opening 13 (Fig. 9) therein to fitting 14 (Fig. 3) at end plate 15 of the frame. From this fitting 14 wire 11 extends to terminal 16 in insulation block 17 as an extension integral with funnel or shell 18, normally yieldably thrust by spring arms 19 to have the upper portion of the shell 18 seat about depending ledge 20 from overhang 21 fixed with the end plate 15.

From the terminal 16 there extends from the block 17 into the shell 18 conductor wire 22, desirably of refractory material, such as platinum. As here shown, from downward dip 23 the wire 22 has upwardly inclined portion 24 terminating in outward loop 25. Companion similar terminal, spaced therefrom approximately 1 mm. provides such terminals as right and left, with the pair of loops 25 on their opposing sides forming a converging way to the throat, the portions 24 downwardly diverging therefrom. A drop of liquid, containing an electrolyte for conductivity promotion, such as urine or other secretions may serve as a switch at this throat adjacent the loops 25. The gravity action of the drop results in its quick passing through the throat. Notwithstanding the electrolyte, normally present in body fluids, there is not tendency to coat or corrode to defeat the operation of the switch at the low voltage herein adopted. The contour of the wires from the throat is such that the drops readily clear.

The shell 18 of insulation material, may desirably be of phenol condensation molded substance, and is herein provided with block 26, diametrically opposite the block 17, into which extends companion platinum wire 27 as the mate to the wire 22. At terminal 28 in the block 26, the wire 27 connects with wire 29 extending to fine winding high resistance coil 30 (Figs. 3, 5) mounted on the underside of the overhang 21. This coil 30 is provided with core 31, normally in a limited drop position as determined by screws 32. As this solenoid is de-energized, there is insurance that the core 31 may not stick, but that the drop position will be maintained, by the action of springs 33 about the screws 32 urging the core downward from the coil 30. The connection of the core 31 to the guide screws 32 is by disk 34 on its underside having depending ear 35 mounting pivot pin 36 for depending pawl 37. This pawl 37 has horizontally extending short arm 38 with which compression helical spring 39 coacts for urging the pawl 37 at all times toward shaft 40 mounted in bracket 41 carried by the plate 15.

Helical spring 42 (Fig. 3) on the shaft 40, is a longitudinal lost motion take-up and brake for ratchets 43, 44, 45, 46 (Figs. 5, 6, 7, 8), having multiple numbers of teeth in descending geometrical proportion. The ratchet 43 is the only one engaged by the pawl 37. Arm 47 (Figs. 3, 5) from the bracket 41 has an offset carrying set screw 48 so that the pawl 37 may shift only slightly clear of this ratchet 43 in the solenoid-effected reciprocations brought about for operating this intermittent grip device.

In the device of this disclosure there may be a graphic recording of the number of drops passing through the throat formed by the loops 25. There may be one of several predetermined styles or types of graph produced by this instrument. The several styles or types of graph contour provide a code readily legible to an operator, and described in detail later in this specification. The control for choice of a predetermined type of graph is governed by the transmission from this solenoid controlled device. To this end there is mounted in the bracket 41 (Figs. 3, 5) slide rod 49 parallel to the shaft 40. Loosely mounted on the rod 49 is depending dog 50, which dog is held against longitudinal shifting along this rod 49 by means of collars 51, 52.

The collar 52 is provided with an extension 53 therefrom as a catch movable by rotation of the rod 49 to engage or abut upper arm 54 which is an extension from the dog 50. The member 50, 54, is normally freely swingable on the rod 49. However, the rod may be rotated sufficiently to bring the extension 53 to engage the arm 54 to manually control the movement of the dog portion 50 clear of its engagement with the ratchets. Terminally, the rod 49 carries knurled head 55 fixed therewith and is provided with radially extending pin 56 to engage any one of notches 57 (Figs. 3, 9) in projection 58 from the plate 15. When the pin 56 is in engagement with any one of the notches 57, the catch or extension 53 extends toward the plate 15, free from engagement with the arm 54 and out of range of normal swing of this arm 54 in performing its function.

From the upper arm 54 there extends rod or bar 59 (Figs. 2, 5) thru the plate 15. The portion of the bar 59 engaged by the upper terminus of the arm 54 is at right angles to the portion of said bar extending through the plate 15. This permits the necessary sliding movement of the arm 54 along the bar 59 as the dog 50 is shifted from one ratchet to another. Compression helical spring 60 is about this bar 59 between plate 15 and collar 61 fixed thereon, thereby pulling the upper end of the arm 54 toward the plate 15 to hold the dog 50 in ratchet engaging position.

The bar 59 extending beyond the collar 61 is guided by depending bracket 62 (Figs. 2, 9) adjustable along main bar 63 from the plate 15 to companion plate 64. The minor bar 59 steadied by the guide bracket 62 terminally carries writing pen 65 anchored to the bar 59 by set screw 66. This pen 65, including a reservoir for ink, serves as a graph producer to respond to ratchet performances.

Under the code herein disclosed, with the dog 50 coacting with the ratchet 43, there is writing on chart 67 (Figs. 2, 11) at the range of isochronal lines 68 of graph 69, showing a horizontal throw of the pen 65 for each drop of liquid closing the electric circuit at the loops 25, for such energizes the solenoid and gives an upward pull on the pawl 37. By operating the knurled head 55 to shift the pin 56 into the second notch 57 away from the bracket 41, the dog 50 coacts with the ratchet 44, and now only every fourth drop is counted in writing the graph 70. Upon the next shifting, the dog 50 is located to coact with the ratchet 45, and there is the continuous writing of graph 71 with the projections each disclosing eight drops. By again rocking the rod 49, the overhang 53 clears the dog 50 to permit longitudinal shifting for locating the dog 50 at the ratchet 46, producing graph 72, a step for each sixteenth drop.

It is thus seen that, selectively there may be produced a code for ready observation to disclose a drop rate as a function of time, for chart 67 is loaded by weight 73 (Fig. 9) to hold such in a vertical plane sufficiently taut for the pen 65 to be effective thereon, while such chart is supplied over roll 74 with pins 75 thereon entering openings 76 (Figs. 2, 11) marginally of the chart 67 for maintaining alignment and feed rate as the roll 74 on shaft 77 (Fig. 9), has its escapement rate determined by spring motor clock mechanism 78 in housing 79 (Figs. 1, 2, 4). This mechanism may be cut in or cut out by starting control stem 80. Notwithstanding the device is a drop counter, the writer is shown as producing a continuous graph. Due to the time function travel of the chart 67, the relation of the writing to the isochronal parallel horizontal lines 68, produces a record disclosing the drop rate, or the frequency of current closing.

The shell 18 has windows 81 (Fig. 3) thru which may be observed the switch at the loops 25. Controllable dropper therefor is provided at cup 82 thereover having adjusting screw 83 for regulating supply of liquid thereto by way of duct 84. By adjusting the screw 83 for a determined supply rate, the circuit containing the solenoid may bring about a desired timing control. Due to the code mechanism of the ratchets, multiples of the dropping may be adopted as thus integrated.

While readily adaptable in many ways, there is herein disclosed a diagnosis apparatus embodiment, wherein catheter 85 (Fig. 1) may be located in ureter 86 as from kidney 87, the entrance being by way of natural passages into body 88 of the patient. Duct 89 from the catheter 85 provides flexible connection to fitting 90 (Fig. 10). In this fitting 90 is valve 92 (Figs. 4, 10) herein shown as effective straight-away to communicate with manometer 93 (Figs. 2, 4, 10) as an open top vertical tube of approximately capillary cross-section and having graduations 94.

From this fitting 90 and past the manometer 93, duct 95, supported on a suitable collar carried by bar 91 (Fig. 4) parallel to the bar 63 and also extending between the plates 15 and 64, extends to chamber 96 (Figs. 2, 10), below flexible diaphragm 97. From this chamber 96 there extends the duct 84 to the dropper cup 82 (Figs. 2, 3) of the drop counter control mechanism.

In practice it is in order initially to charge the apparatus with liquid. This may be done at the valve 92 (Fig. 4) by supply at port 98 (Fig. 4). Such port 98, with the valve 92 adjusted therefor, may be used for flushing or supplying a saline solution, or other treating substances. Accordingly there is in the set up and assembly full range of use for diagnosis as well as treatments to show reactions in further diagnosis, or for rectifying conditions developed as present from the diagnosis. The charging of the apparatus with liquid places the entire esuipment in condition for writing response forthwith. The charge of the apparatus is through the port 98 past the valve 92 into ducts 89 and 95. This charging may be by attaching a tube to the port 98 which extends to a liquid supply above the apparatus so that there would be gravity flow into the device. In flushing operations the liquid may flow from a suitable tube connected to the port either by gravity flow or from any pressure source. In the charging or flushing operation, the port 98 is in communication with the ducts 95 and 89 as shown by the indicators (Fig. 4) on the knurled head of the valve. Following the flushing or charging operation, the valve may be operated to cut off the port 98 while forming a continuous passageway from the duct 89 to the duct 95. It will also readily be seen that communication may be had through the port 98 into either of the ducts 89 or 95 independently of the other.

The screw 83 (Fig. 2) is desirably adjusted in response to the apparatus assembly with the patient to place a pressure or resistance to peristaltic action of the ureter, say of 4 cm. of water as disclosed in the manometer 93 by the graduations 94. At the chamber 96 (Fig. 10) there is a tambour. The diaphragm 97 is contacted by foot 99 thru port 100 in cover 101 for the chamber 96. The chamber providing member 96 is mounted on the bar 63 and has inflow from duct 95 and outflow through duct 84. The duct in the manometer is in communication with the duct 95 at the fitting 90 (Fig. 10). To force a liquid from the duct 89, which is in communication with the duct 95, into a patient, considerable force would be necessary and in the normal operation there is no back flow through the duct 95. Consequently, if the flow from the chamber 96 through the duct 84 is restricted as by the screw 83, the pressure in the chamber 96 and in the duct 95 will be increased. Therefore, the liquid in the manometer will rise therein. The screw 83, as adjusted, fixes the restriction of flow through the duct 84. This fixed restriction is readable on the manometer for the response in the manometer is clearly indicated. Further flow from the patient into the duct 95 and then into the chamber 84 acts against the diaphragm 97, and as this diaphragm 97 is lifted, the mechanism connected with the diaphragm abutting foot 99 will be operated. A quantity of liquid amounting to a drop will lift the diaphragm 97 and there is a time element for the diaphragm 97 to drop to normal position because a drop of liquid to flow through the restricted duct 84 consumes time. The mechanism operated from the foot 99 is a recording device producing a graph on the chart 67.

Adjacent and laterally of the chamber 96 is stem 102. Mounted on this stem by set screw 103 is rigid arm 104 providing a fulcrum 105 and lever 106. The lever 106 is connected to the foot 99 and carries counterweight 107 adjustable therealong. Vertical movement of the foot 99 transmits movement to the lever 106 and to those parts connected therewith. Counterweight 107, shiftable along the lever 106, may be used to adjust the resistance against movement of the foot. The lever 106 is rigid with rockable member 108. The member 108 extends from the arm 104 and is externally threaded and provided with transverse slot 109. Knurled head 110 on the rockable member 108 acts upon flexible spring steel tongue 111 (Fig. 10) of depending arm 112. Between the head 110 and the arm 104 is compression helical spring 113.

By this adjustment of the tongue 111, the thrusting action of the arm 112 terminally carrying pen 114 is regulated upon the chart 67 to the desired writing pressure. Longitudinally extending pressure lines 115 (Fig. 11) on the chart 67 are parallel and it is convenient, if on the 4 cm. adjustment to consider such as from zero pressure line 116 as the base from which the pen 114 writes, with isochronal lines 117 therefrom to joint with the isochronal lines 68. The pens 65, 114 are located at a common isochronal line 68, 117, upon starting and maintain such relation. The screw 83 (Figs. 2, 4) permits the checking with the manometer to locate the pen 114 as to the manometer disclosing pressure, while the counterweight 107 may be adjusted for the final position of the pen 114 at the line 116 (Fig. 11).

Disk 118 (Fig. 2) is mounted on threaded portion 119 of the shaft 77 to normally abut against the end of the roll 74. Initial setting of the chart may be had by turning the disk 118 as to the threaded portion 119, thereby backing this clutch disk away from the end of the roll 74. The chart 67 may then be pulled freely to the starting point and the disk again rotated to abut the end of the roll. Ears 120 (Figs. 1, 3) mount reserve paper supply roll 121 as a source of supply for the chart 67. Upstanding handle 122 (Figs. 2, 4, 9) fixed with rock bar 91 is effective against the action of torsion spring 123 to release shoes 124 (Figs. 4, 9) yieldably holding the chart openings 76 (Fig. 11) upon the pins 75 (Figs. 2, 4, 9) of the roll 74. The chart may be thus fed about the roll 74 to the weight 73. Release of the handle 122 allows the spring to hold the chart for normal feeding operation.

Shield 125 over the roll 121 is shown as terminating in trough 126. This will receive any overflow or leakage from above the manometer 93, or at its removable connection. Furthermore at port 98 (Fig. 4), it may be desirable to drain manometer 93 and fill it with treating fluid. The drainage may be collected by the trough 126. Plug 127 may close the port 98. From the trough 126, duct 128 (Figs. 1, 10) may extend to fitting 129, there to meet duct 130 (Figs. 1, 2, 3) from the shell 18, to take off all the body fluid by duct 131, for spill into a waste.

Spring arm 132 (Fig. 4) is readily shiftable to free shaft 133 to permit placing or removing of supply roll 121.

On the bar 63 is block 134 providing mounting support for the chamber 96. Lateral extension from this block 134 provides a seat for the chamber providing member 96 which seat has therethru an opening 135 (Fig. 10) entered by lug 136 on the bottom of the chamber providing member 96. Spring bail 137, pivoted to the chamber providing member 96 swings down over this extension of the block 134, and thus holds the tambour assembled with the apparatus in such manner that by snapping the bail 137 off such extension, the tambour with its connected parts may be readily removed from the rest of the apparatus, for the cup 82 (Fig. 3) merely nests in the overhang 21. In the operation hereunder, it is desirable first that the apparatus be filled with liquid. In the event such be a saline solution it has stimulating and pathological value in connection with the operation of the bodily functions of the patient. This charging and draining is readily effected by the three-way valve 92 having markings (Fig. 4). With the apparatus fully charged with liquid and connection made to a fluid supply from the patient, herein indicated as from the kidney, there is communication to the manometer 93 by way of the duct 89 (Fig. 1). Adjusting of the screw 83 reflects by way of the duct 84 and the tambour chamber 96 a pressure which, as hereinbefore suggested, may be taken as 4 cm., and that to bring the pointer or needle of pen 114 (Fig. 2) to the zero pressure line 116 (Fig. 11). It is thus seen that pressure on the diaphragm 97 (Fig. 10) greater than 4 cm. will swing the marker 114 to the left of the line 116 (Fig. 11), while those pressures which are less than 4 cm. will effect marking to the right of this line 116 of the chart 67. This chart 67 has a time function determined by clock mechanism 78 (Fig. 2) and with the paper kept taut by the weight 73 (Fig. 9).

From this section of the duct communicating with the tambour at the diaphragm chamber 96, the duct section 84 extends to the dropper for fluid flow to the terminals 24 and as the drops pass such terminals, electric circuit (Fig. 12) is completed to energize solenoid 31 and effect marking on the chart 67 in the region of lines 68 (Fig. 11) by the action of the pen 65. Through the control of the different dog and ratchet connections, variously cut in by the location of the notched bar 58, the counting of the drops may be in multiples. That is, by ratchets 43, 44, 45, 46 (Figs. 8, 7, 6, 5) such may be respectively for each drop, shown in graph 69 (Fig. 11); a deviation from straight line marking for each four drops, 70; for each eight drops, 71; and for each sixteen drops, 72.

It is thus seen that in the device of this disclosure organic functioning as to liquid secretion and pressure or muscular action is evidenced and disclosed not only at the manometer but at the indicator or pin 114 responsive to pressure to make a record at the chart. There may be considerable muscular effort and scant volume. To avoid disturbance from such discrepancy there is contemporaneous marking in the counting of the drops.

What is claimed and it is desired to secure by Letters Patent is:

1. Physiological measuring apparatus embodying a liquid supply duct, a duct having a discharge port, mechanism embodying drop actuated means, a recording device to be actuated by said means, multiple designation means for the device, and designation selecting adjusting means for the designation means.

2. Physiological apparatus embodying ducts, said ducts including a restricted section adapted to maintain drops of fluid in lineal series, a supply duct section thereto, a duct section having a discharge port to receive flow from the restricted section, drop actuated means for fluid from the supply duct section to the discharge port, and a continuous-writing drop number-indicating recorder actuable from said actuated means.

3. Physiological apparatus embodying ducts, a supply duct section adapted to receive body fluid flow, a duct section restricted for maintenance of drops of fluid in lineal series, a device reacting to the flow of said fluid in drops, a recorder operable from the device, and manually adjustable means between the recorder and device for affecting the recorder in multiple response.

4. Physiological apparatus comprising a dropper, a shell, a pair of upwardly converging spaced terminals in the shell, a duct section restricted for spilling drops at the terminals successively, and recording means embodying an electric circuit in which said terminals are adapted to be closed by said drops in lineal series in tallying said drops.

5. A device of the class described comprising a catheter for receiving fluid, a duct from said catheter, a chamber to which said duct carries the fluid from the catheter, said chamber having an expansible wall portion, said duct having a continuation from the chamber provided with a restricted way portion whereby when fluid entrance into the chamber is in excess of the discharge permitted by the restricted way said chamber wall portion is expanded, mechanism operable by the expansion of said wall portion, and recording means controlled by said mechanism.

ELMER I. McKESSON.